United States Patent [19]

Kulzer

[11] Patent Number: 5,051,730
[45] Date of Patent: Sep. 24, 1991

[54] CIRCUIT ARRANGEMENT FOR CHARGING RECTIFIERS FOR DC ENERGY STORAGE DEVICES IN TELECOMMUNICATIONS SYSTEMS, PARTICULARLY TELEPHONE SWITCHING SYSTEMS

[75] Inventor: Ernst Kulzer, Pullach, Fed. Rep. of Germany

[73] Assignee: Siemens Aktiengesellschaft, Munich

[21] Appl. No.: 529,382

[22] Filed: May 29, 1990

[30] Foreign Application Priority Data

Aug. 25, 1989 [DE] Fed. Rep. of Germany ....... 3928222

[51] Int. Cl.$^5$ ............................................. G08B 21/00
[52] U.S. Cl. ...................................... 340/635; 363/55; 379/33
[58] Field of Search .................. 340/635, 636; 379/32, 379/33, 324, 413; 307/64, 66; 363/55, 56, 57, 58

[56] References Cited

U.S. PATENT DOCUMENTS 4,246,633 1/1981 Borkovitz ......................... 307/66 X
4,930,062 5/1990 Yamada ................................. 363/55

Primary Examiner—Donnie L. Crosland
Assistant Examiner—Jeffery A. Hofsass
Attorney, Agent, or Firm—Hill, Van Santen, Steadman & Simpson

[57] ABSTRACT

Monitoring equipment is provided in a charging rectifier for operational monitoring of a converter supplied by the AC voltage supply network and is provided with DC voltage feed via two rectifiers serving the purpose of decoupling, in particular, via one of the two rectifiers from an auxiliary converter likewise supplied from the AC voltage supply network, on the one hand, and via another of the two rectifiers from a DC converter supplied by the DC energy storage device, on the other hand. The DC voltage offered by the DC converter is higher than the DC voltage offered by the auxiliary converter. The monitoring equipment distinguishes between these DC voltages with reference to magnitude and, when receiving a lower DC voltage, checks for the presence of the DC voltage supplied to the DC converter by the DC energy storage device. When receiving the lower DC voltage and given the presence of the DC voltage supplied to the DC converter, the monitoring equipment outputs a signal that indicates a malfunction of the DC converter.

2 Claims, 1 Drawing Sheet

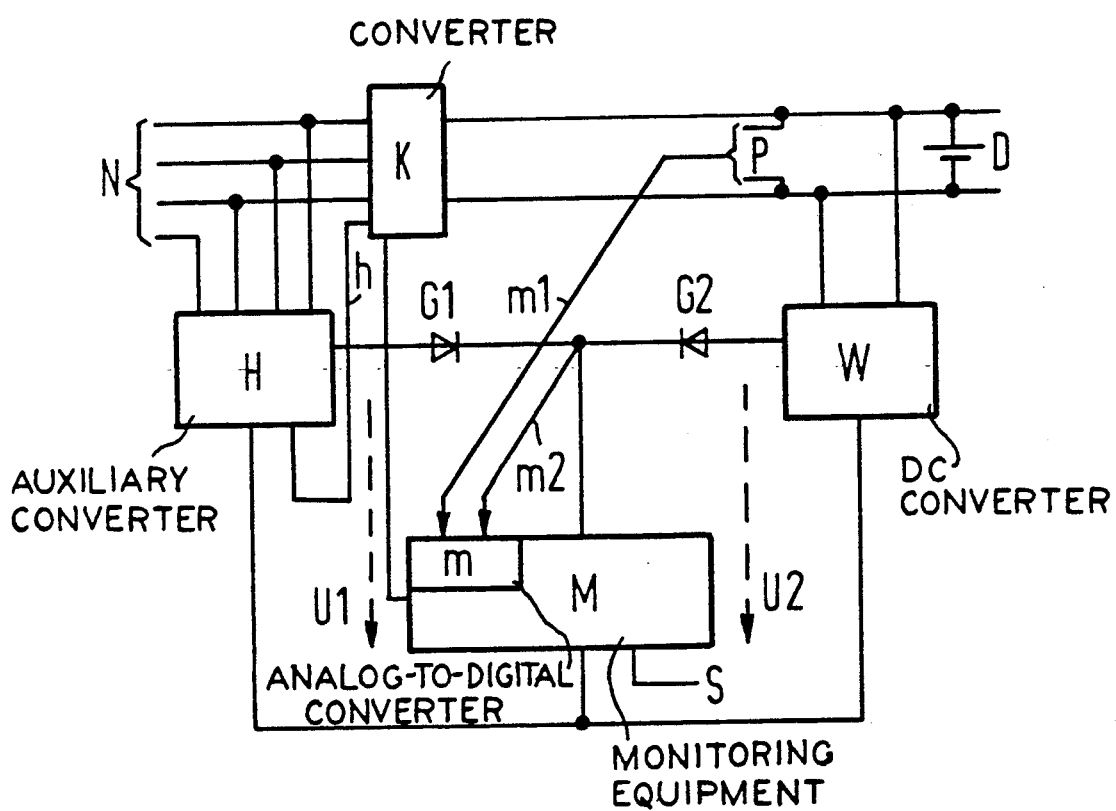

CIRCUIT ARRANGEMENT FOR CHARGING RECTIFIERS FOR DC ENERGY STORAGE DEVICES IN TELECOMMUNICATIONS SYSTEMS, PARTICULARLY TELEPHONE SWITCHING SYSTEMS

BACKGROUND OF THE INVENTION

1. Field of the Invention

The present invention relates to a circuit arrangement for charging rectifiers for DC energy storage devices, particularly storage batteries, in telecommunications systems, particularly telephone exchange systems, in a monitoring apparatus serving for a function check of a converter supplied by the AC voltage supply network which is offered DC voltage feed, both by an auxiliary converter and likewise from the AC voltage supply network, as well as by a DC converter supplied by a DC energy storage device, being offered thereto via a crystal diode assigned to the auxiliary converter and to the DC converter and serving the purpose of decoupling.

2. Description of the Prior Art

Monitoring equipment that serve various control functions are provided in charging rectifiers of the type set forth above and that is presumed known in the art. The monitoring of the output voltage and of the output current of the charging rectifier can be included among these control functions. Further, operating values (voltage, current and the like) determined by such a monitoring equipment can be made visible with the assistance of a display device. In addition, such a monitoring equipment can also serve for controlling the charging events. Assume a charging rectifier is controlled during normal operations such that it merely guarantees the preservation of the charge of the DC energy storage device (operating condition of "maintaining charge"). After an outage of the AC voltage supply of the charging rectifier, by contrast, care must be exercised to see that the DC energy storage device that was partially discharged during the outage is again recharged (operating condition of "charging"). To this end, the monitoring equipment measures the duration of the outage of the AC voltage supply and, if this duration has exceeded a defined, prescribed length, causes a switching of the charging rectifier to a charging condition for a defined time interval, i.e. accomplishes the recharging of the DC energy storage device.

A monitoring equipment in a circuit arrangement of the type generally set forth above can also have still further functions such as, for example, the regulation of the output voltage and/or of the output current of the charging rectifier, dependent on defined measurable variables. There is the general requirement for such monitoring equipment that they must be capable of continuing to operate given an outage of the AC voltage supply network, for the above measurement of the duration of an outage of the AC voltage supply. The DC converter is provided for this purpose, the DC voltage supply for this monitoring equipment being assured via the DC converter in case of an outage of the AC voltage supply. At the same time, however, there is the requirement that a monitoring equipment also continues to work, in particular, without interruption, when the clamp voltage of the DC energy storage device drops to such an extent, for example as a consequence of a short or of an overload, that a lower voltage limiting value below which the supply voltage for the monitoring equipment should not drop is downwardly transgressed. It is therefore provided in a circuit arrangement of the type generally set forth above that the monitoring equipment is supplied with DC voltage from two sides via two crystal diodes serving the purpose of mutual decoupling, in particular from the auxiliary converter supplied from the AC voltage supply network, on the one hand, and from the DC converter supplied by the DC energy storage device, on the other hand. When one of these two DC voltage sources fails, then the DC voltage supply of the monitoring equipment is still guaranteed to be free of interruption via the respective other of the two energy sources.

The above-described supply of the monitoring equipment with DC voltages from the DC converter, on the one hand, and from the auxiliary converter, on the other hand, however, harbors the risk that a malfunction occurring in the DC converter will not be recognized, but this makes the monitoring equipment currentless, i.e. interrupts its continued operation, when the DC voltage supply is interrupted due to a malfunction.

SUMMARY OF THE INVENTION

In a circuit arrangement of the type generally set forth above, the object of the present invention is to provide suitable precautions with whose assistance the operability of the DC converter can be monitored in a simple manner, whereby the difficulty must be overcome that, given outage of the voltage supply by the DC converter, the voltage supply for the monitoring equipment is continued by supplying DC voltage to the monitoring equipment from the auxiliary converter. This voltage outage which, as set forth, should not, on the one hand, have a negative influence of the continued working of the monitoring equipment, however, is covered and masked by the supply of DC voltages to the monitoring equipment preceding from two sides (via the two mentioned rectifiers or crystal diodes).

The above object is achieved, according to the present invention, in that the DC voltage offered by the DC converter is set higher than the DC voltage offered by the auxiliary converter, in that the monitoring equipment discriminates between these two DC voltages on the basis of their magnitude and, when receiving the lower DC voltage, checks for the presence of the DC voltage supplied to the DC converter by the DC energy storage device, particularly within prescribed limit values, and in that the monitoring equipment, when receiving the lower DC voltage and given the presence of the DC voltage supplied to the DC converter by the DC energy storage device, outputs a signal indicating a malfunction of the DC converter.

BRIEF DESCRIPTION OF THE DRAWING

Other objects, features and advantages of the invention, its organization, construction and operation will be best understood from the following detailed description, taken in conjunction with the accompanying drawing on which there is a single figure which is a schematic representation of an exemplary embodiment of the invention.

DESCRIPTION OF THE PREFERRED EMBODIMENT

Referring to the drawing, a charging rectifier has its input connected to an AC voltage supply network N.

Among other things, the charging rectifier comprises a converter K by way of which the charging of a feed battery (exchange battery) occurs in a known manner. The converter has its input connected to the AC voltage supply network. An auxiliary converter H is likewise connected thereto. The auxiliary converter H supplies an output voltage U1 to a monitoring equipment M via a rectifier G1, among other things. The monitoring equipment M is also supplied with a DC voltage on the part of a DC converter W via a rectifier G2. The two rectifiers G1 and G2 serve the purpose of decoupling the auxiliary converter H and the DC converter W from one another in a known manner.

The output voltage U2 of the DC converter W is slightly higher than the output voltage U1 of the auxiliary converter H. The monitoring equipment M is therefore offered DC voltage feed both from the auxiliary converter H supplied by the AC voltage supply network and from the DC converter W supplied by the supply battery D. As previously mentioned, in that the DC voltage offered by the DC converter W is slightly higher than the DC voltage offered by the auxiliary converter H, the monitoring equipment receives its energy supply, i.e. its DC voltage feed, proceeding from the DC converter W in the normal operating situation.

The functions of a monitoring equipment can be numerous. The output voltage of the converter K, as well as its current load can be monitored with the assistance thereof; likewise, the clamp voltage of the supply or feed battery can also be monitored. Further electrical values of the charging rectifier can also be acquired and registered with the assistance of the monitoring equipment. Further, values and data acquired by the monitoring equipment can be displayed at a display with the assistance of the monitoring equipment. Further, the functions of the converter K and, potentially, of the auxiliary converter H, as well, can also be controlled with the assistance of the monitoring equipment. There is therefore a possibility that the auxiliary converter H influences the converter K in terms of control via a path h and that the monitoring equipment M indirectly monitors the function of the auxiliary converter H in this manner.

A further job of the monitoring equipment M is the implementation of a time measurement and of a timing control, in conjunction with the temporary, for example, a malfunction-induced outage of the AC voltage supply network N. During the duration of such a outage, as known, the voltage supply of the circuit equipment to be supplied occurs exclusively via the supply or feed battery D. This is thereby discharged during the outage. At the end of the outage of the AC voltage supply, a recharging of the feed or supply battery is required for a defined duration so that the full charge of the feed or supply battery is again established. During normal operation, a recharging of the feed battery occurs via the converter K only based on the measure of the average power consumption of the units to be supplied, including the energy lost within the feed battery itself.

The duration of a recharging after an outage of the AC voltage supply N can be used based on the duration of this outage. Based on the measure of the duration of the outage of the AC voltage supply, the monitoring equipment M therefore dimensions the duration of a subsequent recharging of the feed or supply battery D. It is also likewise possible to merely identify with the assistance of a monitoring equipment whether or not the duration of the outage of the AC voltage supply has exceeded a defined chronological limit value. When the duration of the interruption of the AC voltage supply lies below this defined limit value, then a recharging is not required. When, however, the duration of the interruption of the AC voltage supply exceeds this limit value, then this is registered by the monitoring equipment M and it accordingly controls a recharging event having a defined duration. It can be provided that the duration of the recharging is constant or that it is controlled by the monitoring equipment based on the measure of the duration of the interruption of the AC voltage supply.

Since one of the jobs included among the jobs of the monitoring equipment M is to continue to work during the duration of the interruption of the AC voltage supply in order, among other things, to be able to determine the duration of the interruption, is it also necessary that it continue to be supplied with DC voltage. This occurs via the DC converter W in the manner already set forth. However, the case can also occur that the clamp voltage of the feed or supply battery D drops, for example, the consequence of a short or as a consequence of a overload having a corresponding duration. In such a case (wherein, therefore, the AC voltage supply is not interrupted, i.e. not the supply of DC voltage from the auxiliary converter H via the rectifier G1 as well), the input voltage required for the DC converter W can fall below an allowable, lower limit value. This means that the monitoring equipment M no longer receives a DC voltage feed from the DC converter W. As set forth above, however, continued energy supply in this operating situation is nonetheless assured with DC voltage for the monitoring equipment M, in particular, without transition it receives its DC voltage proceeding from the auxiliary converter H There is then the requirement that the operability of the DC converter W is continuously monitored. It is provided for the purpose that the DC voltage offered by the DC converter W is somewhat higher than that of the DC voltage offered by the auxiliary converter H. This results in that, given an outage of the operability of the DC converter W, the DC feed voltage supplied to the monitoring equipment M drops somewhat, namely to that value that is critical for the auxiliary converter H as output voltage, via drops by the difference of the output voltage of the DC converter W and the aforementioned output voltage.

In an analog-to-digital converter m of the monitoring equipment a potential is received at the junction between the two rectifiers G1 and G2 via a path m2. Via this path, therefore, the analog-to-digital converter m receives the potential from the junction. The analog-to-digital converter m contains an intrinsically-known threshold measuring device with whose assistance it can discriminate between the DC voltage that is a part of the input side of the monitoring equipment, discriminating therebetween with reference to the respective magnitude. The appertaining threshold therefore lies between the two voltage values of the voltage supplied for the DC converter W, on the one hand, and the DC voltage supplied by the auxiliary converter H, on the other hand. The monitoring equipment M therefore checks the potential lying at the junction between the rectifiers G1 and G2. When receiving the lower DC voltage, the monitoring equipment undertakes a further measurement, namely a measurement of the clamp voltage of the feed or supply battery via the terminals P and via a path ml. By way of the pass ml, therefore, the clamp voltage of the feed or supply battery is likewise supplied by the analog-to-digital converter m. Assume this to be equipped with a further threshold measuring device with whose assistance an identification can be made to see whether the clamp voltage of the feed or supply battery D lies above or below a defined limit value.

When the analog-to-digital converter m of the monitoring equipment M then receives the lower DC voltage via the junction between the two rectifiers G1 and G2 which, therefore, is then supplied from the auxiliary converter H via the rectifier G1 and when the monitoring equipment, with its analog-to-digital converter m, recognizes that the supply voltage supplied to the DC converter W is present and, as required, lies above the limit value, then the monitoring equipment can recognize with reference thereto that the DC voltage converter W is affected by a malfunction and, accordingly, outputs a signal for a malfunction of the DC converter W via a path S. However, there is also the possibility of taking the voltage supply of the DC converter W via the path ml not via the terminals P but directly at the input terminals of the DC converter W via the feed voltage supplied to the DC converter W.

It should be pointed out that the auxiliary converter H, among other things, supplies the voltages required for the control of the converter K. When, therefore, a malfunction at the auxiliary converter H occurs, then this influences the operation of the converter K. manner not set forth in detail, this is, in turn, recognized, registered and signaled by the monitoring equipment M.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a charging rectifier for a DC energy storage device, in particular a storage battery in telecommunications equipment,
   comprising: a first converter connected to and supplied by an AC voltage supply network and connected to and operable to charge said DC energy storage device;
   an auxiliary converter connected to the AC voltage supply network;
   a DC converter connected to and supplied with energy by said DC energy storage device,
   first and second crystal diodes respectively connected to said auxiliary converter and to said DC converter and connected together to a common point decoupling said auxiliary converter and said DC converter from one another, said auxiliary converter and said DC converter each providing a DC voltage to the common point via the respective crystal diode, with a DC voltage offered by said DC converter being set higher than the DC voltage offered by said auxiliary converter; and
   monitoring equipment connected to said DC energy storage device and to the common point for monitoring the magnitude of the voltage at the common point, said monitoring equipment responsive to the receipt of only a DC voltage of a magnitude that is normally provided from said auxiliary converter to check for the presence of DC voltage provided to said DC voltage converter by said DC energy storage device, and operable in response to such presence to produce an alarm signal indicating a malfunction of said DC converter.

2. The circuit arrangement of claim 1, wherein:
   said first converter is connected to and received control voltages from said auxiliary converter; and
   said monitoring equipment is connected to said auxiliary converter for receiving said control voltages and includes means for monitoring the operation of said auxiliary converter via said control voltages.

* * * * *